Patented Dec. 30, 1952

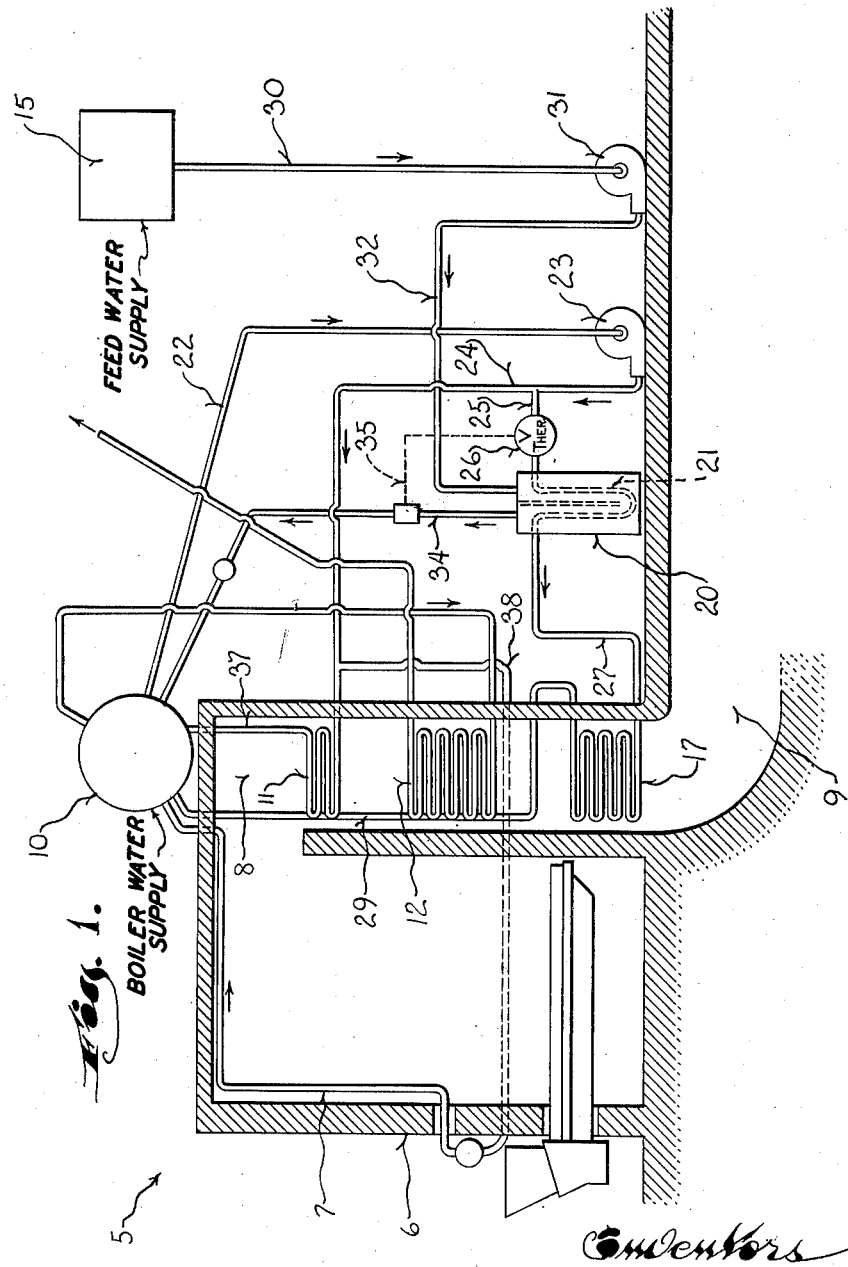

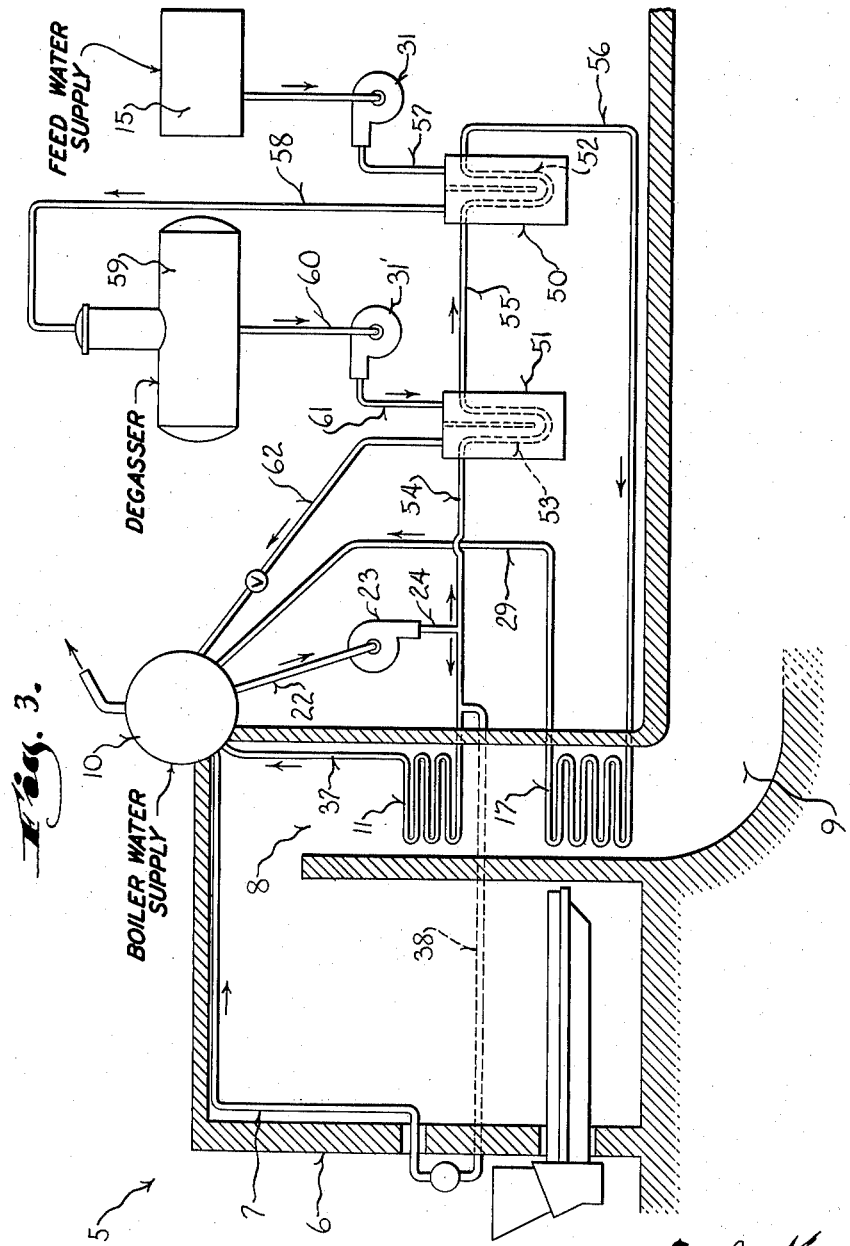

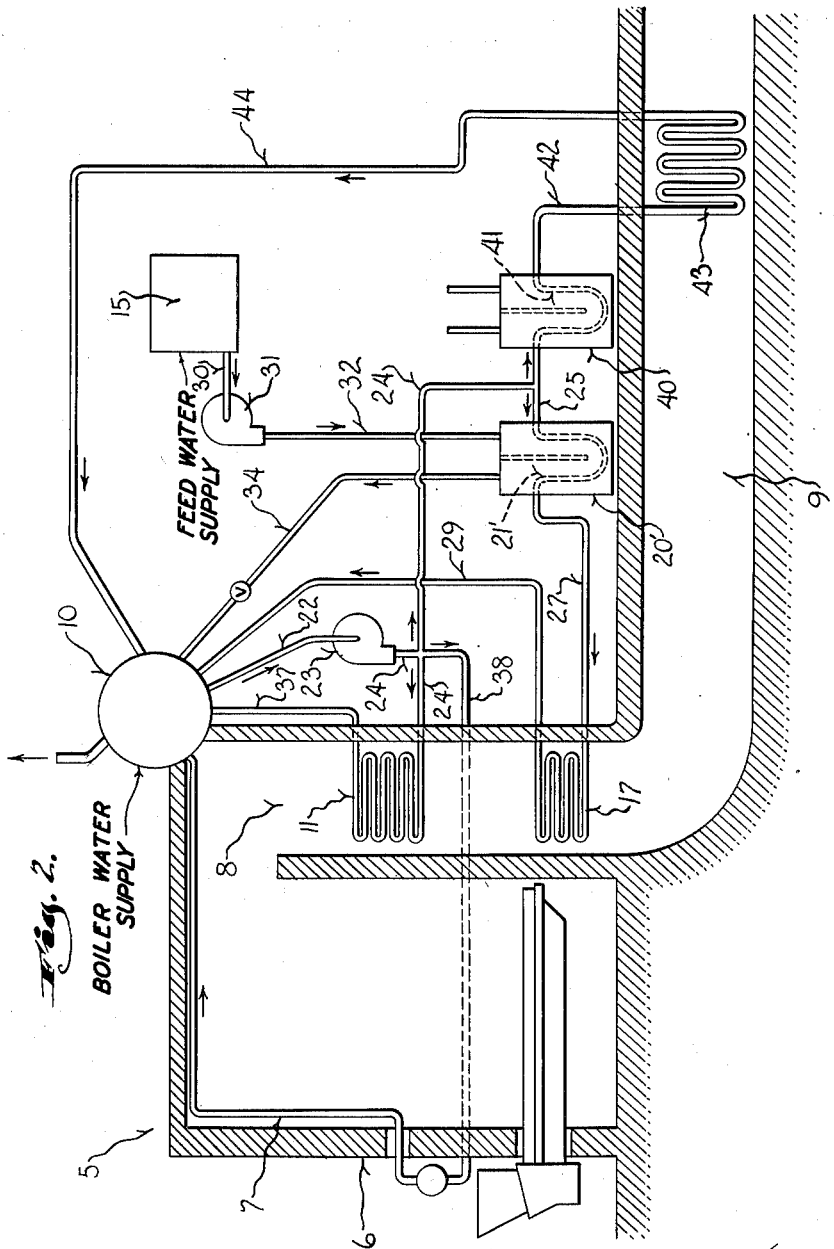

2,623,506

UNITED STATES PATENT OFFICE 2,623,506

METHOD OF AND APPARATUS FOR PREHEATING THE FEED WATER FOR DIRECT FIRED STEAM BOILERS

David Dalin, Stenkullen, Ronninge, Gustav Vilhelm Hagby, Ostertalje, and Torsten Gustaf Albert Wykman, Sodertalje, Sweden, assignors, by direct and mesne assignments, to A B Svenska Maskinverkin, Sodertalje, Sweden, a corporation of Sweden Application January 21, 1948, Serial No. 3,514
In Sweden September 9, 1943

Section 1, Public Law 690, August 8, 1946
Patent expires September 9, 1963

6 Claims. (Cl. 122—412)

This invention relates to steam boiler plants and has more particular reference to an improved manner of preheating the feed or make-up water for such boilers.

In any direct fired boiler, conditions of balance must be maintained between the heat generated in the furnace, the heat absorbed in the process of steam generation and the superheating of such steam, and the amount of feed water supplied to the boiler. As is well known, the amount of make-up or feed water supplied to the steam drum of the boiler must be equal in weight to the amount of steam withdrawn from the boiler.

In order to recover as much as possible of the heat of the waste combustion gases leaving the furnace of steam generator plants, it is customary to employ an economizer having heat absorbing surfaces or tubes located in the flue gas passage of the furnace and over which the hot combustion gases flow after leaving the steam generating surfaces or tubes of the boiler. The feed water required to compensate for the withdrawal of steam from the boiler is ordinarily introduced into the economizer at temperatures ranging from 70° to 130° C., depending upon local conditions, for the preheating of the feed water prior to its introduction into the steam drum.

For reasons which will appear shortly, economizers used for the purpose of preheating the feed water are generally designed and so located in the flue gas passage as to utilize the heat of the waste combustion gases to an extent sufficient to raise the temperature of the feed water to within 15° or 20° C. of the steaming temperature, thus avoiding steam generation in the economizer tubes.

This procedure is followed in the economizers of all steam generator plants where distilled or evaporated water is not used exclusively because the presence of such chemical salts as lime, magnesium, silica, etc. in solution in the feed water would otherwise result in the formation of boiler scale in the economizer tubes.

It is now common practice to avoid as much as possible the precipitation of such lime, magnesium, and silica salts on the boiler tubes as boiler scale by the chemical treatment of the water in the boiler system to neutralize the scale forming fraction of the water. However, inasmuch as the quantity of feed water which may be passed through the economizer is limited for the reasons stated previously, the speed at which it is circulated through the tubes is usually very low and at times may be zero. Hence the neutralizing chemicals in the feed water cannot be kept in suspension and precipitate out as sludge in the economizer tubes despite the fact that the temperature of the water in these tubes may be kept below the boiling point.

The danger of sludge formation in the steam generating boiler tubes or surfaces, however, can easily be avoided by circulation of the water through these steam generating surfaces many times faster than the permissible travel of the feed water through the economizer tubes. In other words, the rate of flow of boiler water through the steam generating surfaces or tubes is not dependent upon the amount of steam withdrawn from the steam drum of the unit and the amount of water circulated through the boiler tubes may be at least four times the amount of steam generated. At such speeds of travel the boiler water is easily enabled to carry in suspension the chemicals used to neutralize the scale forming fractions of the water.

Obviously, the formation of sludge and/or scale in the tubes of the economizer has the effect of insulating the feed water from the waste combustion gases. This lowers the efficiency of the economizer, wastes heat, and results in the tube walls getting too hot and burning out.

It is also well known that the subjection of the feed water in the economizer tubes to relatively high temperature combustion gases has the effect of more rapidly inducing sludge formation if some steam is generated in the economizer, and depending upon the quantity of steam generated, of causing sludge to be converted into a hard scale on the inside surfaces of the tubes. Moreover, in some instances it is extremely difficult to avoid the generation of some steam in the economizer inasmuch as the combustion gases leaving the steam generating surfaces of boilers may easily have a temperature between 300° and 400° C.

The formation of scale in the manner described is extremely objectionable and bothersome as some mechanical or chemical means must be employed for its removal. This is particularly true when the feed water employed contains silica salts in solution.

Since the foregoing objections to economizers of the type now commonly employed have for long been known by steam plant engineers, it follows that there is a definite need for an economizer capable of efficient operation in the sense that it can absorb large quantities of the heat of the waste combustion gases passing thereover without the danger of sludge or scale formation in the tubes of the economizer.

Accordingly, it is the principal object of this invention to provide a steam generating plant with an economizer capable of highly efficient operation and wherein the danger of sludge or scale formation in the economizer tubes is eliminated.

More specifically this invention has as its object the provision of a steam generating plant wherein proper preheating of the required amounts of feed water for the plant and the efficient operation of the economizer is achieved without danger of sludge or scale formation in its heat absorbing surfaces.

In its more specific aspects, this invention provides for the preheating of the feed water required for steam boilers in a heat exchanger heated by boiler water the temperature of which will never be so high that it will cause precipitation of the chemicals dissolved in the feed water, and the recovery of relatively large amounts of the heat of the flue gases by passage of the boiler water thus cooled in the heat exchanger through the tubes of an economizer prior to return of the boiler water to the boiler system.

Stated in another manner, this invention is characterized by a method of preheating the feed water for a steam boiler unit wherein circulating boiler water is drawn from the steam drum of the boiler and divided into a plurality of streams, one of which is forcefully passed through the heat supplying section of a feed water preheater to give off some of its heat to feed water passed through the heat absorbing section of the preheater, said stream thereafter being forcefully passed through another heat exchanger located in the flue gas passage of the boiler unit to absorb heat from the combustion gases before return of the boiler water to the steam drum; while the other of said streams of circulating water is forced through one or more of the steam producing surfaces of the boiler system and then returned to the steam drum.

With the above and other objects in view, which will appear as the description proceeds. this invention resides in the novel construction, combination and arrangement of parts substantially as hereinfter described and more particularly defined by the appended claims, it being understood that such changes in the precise embodiment of the hereindisclosed invention may be made as come within the scope of the claims.

The accompanying drawings illustrate several complete examples of the physical embodiment of the invention constructed according to the best modes so far devised for the practical application of the principles thereof, and in which.

Figure 1 is a diagrammatic view showing a steam boiler plant embodying the principles of this invention;

Figure 2 is a view similar to Figure 1 illustrating a slightly modified embodiment of the invention; and Figure 3 is a diagrammatic view of a steam boiler plant illustrating a still further modified embodiment of the invention.

Referring now more particularly to the accompanying drawings in which like numerals indicate like parts, the preferred embodiment illustrated in Figure 1 shows the invention embodied in a direct fired steam boiler plant indicated generally by the numeral 5. As is customary, the steam boiler plant includes a furnace 6 having main steam generating tubes 7 lining the walls thereof. Connecting with the upper portion of the furnace is a flue gas passage 8 which, in the present case, extends downwardly alongside one wall of the furnace to join with a horizontal passage 9 leading to the stack (not shown).

Steam generated in the main generating tubes 7 is led into the usual steam drum 10, and in the embodiment here concerned the boiler unit is provided with a secondary set of steam generating tubes 11 also connected with the steam drum to conduct steam thereinto. The secondary steam generating tubes 11 are located in the flue gas passage 8 close to its junction with the furnace 6 so as to be heated by the hottest combustion gases leaving the furnace. If desired the coils of a superheater 12 may be disposed in the flue gas passage 8 after the secondary steam generator 11.

As in all steam boilers, feed or make-up water must be supplied to the steam drum 10 in amounts equal by weight to the amount of steam withdrawn from the system. In the present case, the feed water is contained in a reservoir 15 and it may be assumed to have a temperature ranging from 70° to 130° C. The temperature of the feed water in the reservoir, of course, is determined jointly by the amount of condensate returned for use in the boiler and by the quantity of cold outside water which must be added to the system from time to time.

In any event, in the absence of a supply of distilled water, it may also be assumed that the feed water and the boiler water has been treated chemically to neutralize salts of lime, magnesium, silica, etc. Also, before any feed water is admitted into the steam drum to compensate for the steam withdrawn from the system, it should be heated to a temperature close to but preferably slightly less than the temperature of the boiler water in the steam drum at the pressure at which the system is operated.

Previously, it was the custom to heat the feed water to a high temperature by passing it through the coils or tubes of an economizer 17 located in the flue gas passage 8. As explained at length previously, however, economizers used for this purpose in the past have been quite inefficient and in fact highly objectionable for the heating of feed water containing large quantities of scale forming minerals or large quantities of insoluble substances resulting from chemically treating the water and which are prone to precipitate as sludge. Chiefly, the objection to past economizers arose from the fact that sludge and scale very readily formed in them by reason of the inability to circulate any more feed water through their tubes than the limited quantity required to offset an equal weight of steam withdrawn from the system.

In contrast, this invention advantageously makes use of a feed water preheater 20 apart from the boiler and which is best described as of the "double boiler" type. The preheater 20 may be placed in any desired position exteriorly of the steam boiler plant, and includes a heating coil 21 about which the feed water to be preheated is adapted to be circulated. The heat supplying medium circulated through the coil 21 is hot boiler water taken from the steam drum 10 at or slightly less than the steaming temperature corresponding to the pressure maintained in the system.

Such boiler or circulating water is drawn from the drum through a duct 22 leading to the inlet of a force pump 23. The outlet of the force pump 23 is connected with the inlet of the heating coil 21 through a duct 24 and a branch duct 25 containing a thermostatically operated valve 26.

The outlet of the coil 21 leads into the tubes of the economizer 17 through a duct 27 so that cooled boiler water leaving the "double boiler" type feed water preheater is reheated in the economizer by the hot combustion gases passing through the flue 8. After being heated by its forceful circulation through the economizer, the boiler water is returned to the steam drum by means of a duct 29 at which time it may be partly steam since the function of the economizer is now no different than that of the other steaming surfaces.

Feed water is drawn from the reservoir 15 through a duct 30 connecting with the inlet of a force pump 31, the pump having its outlet connected by means of a duct 32 with the space in the preheater 20 surrounding the coil 21. After forced circulation of the feed water over the heating coil 21 for the absorption of heat from the boiler water passing through the coil, the hot feed water is led out of the preheater 20 by means of a duct 34 connecting directly with the steam drum 10.

In order to accurately control the temperature of the feed water supplied to the drum 10, the thermostatic valve 26 in the branch duct 25 leading to the inlet of the coil 21 responds to the temperature of the heated feed water issuing from the preheater 20. The temperature responsive pressure means for actuating the valve 26 is diagrammatically illustrated by the broken line 35 connecting between the duct 34 and the thermostatically operated valve. Hence, it is possible to regulate the rate of flow of hot boiler water through the heating coil 21 to the rate required to raise the temperature of the feed water passing over the coil 21 to a temperature closely corresponding to but preferably slightly less than the temperature of the hot boiler water in the steam drum 10. These results are achieved by reason of the fact that the valve 26 responds to increasingly restrict the flow of hot boiler water through the heating coil 21 as the temperature of the feed water issuing from the preheater approaches the temperature of the boiler water, and conversely, opens to accelerate the flow of hot boiler water through the heating coil as the temperature of the feed water leaving the preheater drops below a predetermined minimum temperature.

Consequently, it will be seen that the feed water is heated to a suitably high temperature in the "double boiler" type preheater 20 through the transfer of heat thereto from the hot circulating water of the boiler.

Another advantage of utilizing the circulating boiler water for preheating the feed water is that it causes the boiler water to be cooled to desirably increase the temperature diffential between the combustion gases and the cooled boiler water circulated through the tubes of the economizer 17. In this respect it is desired to point out that the thermostatically operated valve 26 not only functions to maintain the feed water issuing from the preheater at the proper temperature for admission into the steam drum, but that by regulating the flow of boiler water through the coil 21 and thus governing heat abstraction therefrom, the valve also operates to maintain the temperature of the cooled boiler water entering the economizer tubes at a value which assures the temperature of the tubes being kept as close as possible to the dew point of the combustion gases passing over them. Thus optimum heat recovery without danger of corsion due to condensation of the gases upon the tubes is assured.

It will also be seen that there will be no danger of sludge or scale forming in the economizer tubes since the cooled boiler water at all times may be circulated through them at a much faster rate than was hitherto possible when the feed water was heated in the economizer. It is only when chemically treated water is circulated very slowly along the heat absorbing surfaces or tubes that the chemicals cannot be carried along with the water and thus precipitate out as sludge or even as scale.

One of the most important advantages of preheating the feed water in the preheater 20, is that any sludge which might drop out of solution is accumulated in the space inside the preheater 20. This space may be relatively large and since the preheater is apart from the boiler it is readily cleaned of sludge. Equally important is the fact that steam generation in the preheater 20 can never occur, and there is accordingly no danger of any accumulated sludge therein being converted into hard scale.

The stream of hot boiler water drawn from the drum 10 by means of the pump 23 is divided into two parts in the embodiment of the invention illustrated in Figure 1. One of these streams, as stated previously, passes into the branch duct 25 and is forcefully circulated serially through the heating coil 21 at a rate determined by the thermostatically operated valve 26 and then through the economizer 17 and back to the steam drum. The other stream of boiler water is carried by the duct 24 into the inlet of the secondary steam generating tubes 11 to be further heated by the hot combustion gases entering the flue 8. Steam generated in the tubes 11 is conducted into the steam drum 10 by means of a duct 37.

The stream of boiler circulating water may also be directed into a third branch 38 connecting with the duct 24 and by which the boiler water is circulated through the tubes of the main generator 7.

In the practice of the method of preheating the feed water as described, it will be seen that the heat of the combustion gases is indirectly employed in the preheating of the feed water, and that the economizer 17 is used to far better advantage than previously inasmuch as it is enabled to more efficiently absorb the heat of the combustion gases flowing thereover than was possible when but limited quantities of feed water was heated therein.

The direct fired boiler 5 illustrated in the Figure 2 embodiment of the invention is identical to that previously described with the exception that it lacks the superheater 12. Also in this embodiment of the invention two feed water preheaters 20' and 40 are employed.

The preheater 20' is identical to that of the previous embodiment and is operated in exactly the same manner with the exception that the thermostatically operated valve 26 in the branch duct 25 has been eliminated. Hence, the pump 23 freely circulates hot boiler water through the coil 21' of the preheater and then through the economizer tubes.

The second preheater 40 likewise contains a coil 41 through which hot boiler water is forcefully circulated by means of the pump 23, and the inlet of the coil 41 connects with the branch duct 25 so that this duct leads to the inlets of both preheater coils. While being supplied with hot boiler water from the boiler in the same manner as the preheater 20', the second preheater 40 is adapted to heat the feed water for another boiler unit (not shown), or to effect dissipation of the heat of the boiler water in any other useful manner.

The cooled boiler water issues from the preheater 20' and is circulated through the economizer 17 in the manner described in the preceding embodiment of the invention, but the cooled boiler water issuing from the second preheater 40 is lead through a duct 42 into the tubes of a waste gas heat exchanger 43 disposed in the branch 9 of the flue gas passage to be reheated in said tubes by the hot combustion gases flowing thereover. The water circulated through the heat exchanger 43 is returned as steam or a steam water emulsion to the steam drum by means of a duct 44 connecting it with the outlet of the waste gas heat exchanger 43. By means of this arrangement further recovery of the heat of the combustion gases flowing through the flue gas passages 8 and 9 is effected, and the system rendered more efficient.

In the Figure 3 embodiment of the invention the direct fired steam boiler per se is identical to that of the Figure 2 embodiment, but the feed water drawn from the reservoir 15 is serially passed through two feed water preheaters 50 and 51 having heating coils 52 and 53 respectively through which hot boiler water drawn from the steam drum 19 is forcefully circulated by means of the pump 23. The purpose of this arrangement is to effect a greater drop in temperature of the circulating boiler water passed through the two heating coils so that such cooled boiler water enters the tubes of the economizer 17 at a lower temperature than was possible in either of the two previously described embodiments of the invention since some heat is lost in degassing so that the feed water entering the preheater 51 is at a temperature less than that of the feed water leaving the preheater 50.

Also, in the present case the hot boiler water issues from the pump 23 and passes into a duct 54 leading to the inlets of the main and secondary steam generating tubes 7 and 11 respectively as well as to the inlet of the heating coil 53 of the feed water preheater 51. The outlet of the coil 53 is joined with the inlet of the coil 52 of the preheater 50 by means of a duct which serially connects the coils, and the outlet of the coil 52 connects with the inlet of the economizer by means of a duct 56.

Feed water from the reservoir 15 is likewise drawn therefrom by the pump 31 and forcefully introduced into the preheater 50 by means of a duct 57. The heated feed water issuing from the preheater 50 flows through a duct 58 leading to a degasser 59 and this degasser is communicated with the inlet of a second feed water pump 31' by means of a duct 60. Degassed and partially preheated feed water issues from the outlet of the second feed water pump 31' and leads through a duct 61 into the second preheater 51 for the feed water; and after being heated therein the feed water issues from the second preheater and flows into the steam drum 19 through the duct 62.

Because of the heat loss in the degasser the feed water extracts more of the heat of the boiler water circulated through the coils 52 and 53 of the two feed water heaters than would be the case without the degassing, and the cooled boiler water after serially passing through the preheaters enters the economizer 17 at a temperature such as to better utilize the heat of the waste combustion gases flowing over the economizer surfaces by reason of the existence of a greater temperature differential between these gases and the cooled boiler water.

From the foregoing description taken in connection with the accompanying drawings, it will be readily apparent to those skilled in the art that this invention provides an improved manner of preheating the feed water for a steam generating plant, and which likewise enables greater recovery of the heat of the combustion gases issuing from the furnace of the plant than was hitherto possible with the conventional heating of feed water in an economizer.

What we claim as our invention is:

1. In a steam boiler unit having a steam drum and a flue gas passage through which hot combustion gases flow as they issue from the furnace of the unit: a pair of heat exchangers in said flue gas passage arranged to have combustion gases flow serially thereover; a pump for drawing hot boiler water from the steam drum; means connected with the outlet of the pump for conducting a first part of the water withdrawn from the drum through that one of said pair of heat exchangers over which combustion gases first pass as they issue from the furnace and for returning said first part of the water heated in said designated heat exchanger to the steam drum; a heat exchange device apart from the boiler, said heat exchange device having a heat absorbing section in which feed water may be preheated prior to delivery to the steam drum, and having a heat supplying section; and duct means likewise connected with the outlet of the pump for conducting another part of the boiler water withdrawn from the drum serially through the heat supplying section of said heat exchange device, to cool said other part of the boiler water, through the other of said pair of heat exchangers to reheat said other part of the boiler water, and for returning the reheated boiler water to the steam drum.

2. The method of preheating the feed water for a forced circulation type steam boiler plant prior to delivery of said feed water to the circulatory system of the boiler, which comprises: withdrawing from the boiler circulatory system hot boiler water at a temperature close to but slightly less than the steaming temperature at the prevailing boiler pressure and delivering such boiler water to a point remote from and outside the influence of the heated portions of the boiler plant; dividing the boiler water thus withdrawn from the boiler circulatory system into a plurality of streams; effecting indirect heat exchange between the hot boiler water in one of said streams and the feed water to be preheated so as to heat the feed water to a temperature less than said steaming temperature whereby the heating of the fed water is accomplished without causing precipitants carried thereby to form into scale, and resulting in cooling of the boiler water used for the heating of the feed water; passing the heated feed water at said temperature directly into the boiler circulatory system; returning said cooled boiler water to the boiler circulatory system; effecting indirect heat exchange between the cooled boiler water and the hot flue gases issuing from the furnace of the boiler plant during such return of the boiler water to the boiler circulatory system so as to reheat the boiler water and utilize as much as possible of the heat of said gases; circulating the remainder of said streams of hot boiler water back into the boiler system; and effecting further heating of the remainder of said streams of hot boiler water upon return thereof to the boiler system by subjecting the same to the heat of the hot flue gases.

3. The method of preheating the feed water admitted to the circulatory system of a direct fired forced circulation type steam boiler plant, which comprises the steps of: forcefully circulating hot boiler water through the boiler circulatory system in a plurality of streams, one of which streams passes through a zone externally of the boiler plant before returning to the boiler circulatory system; in said external zone effecting indirect heat exchange between the feed water and the hot boiler water flowing in said designated stream to heat the feed water prior to admittance thereof into the boiler circulatory system; and reheating the boiler water in said designated stream to restore heat thereto abstracted during said heat exchange, during return of the boiler water in said stream to the circulatory system of the boiler, by passing the cooled boiler water in indirect heat exchange relation with the combustion gases leaving the furnace of the boiler plant.

4. The method of preheating the feed water for a forced circulation type steam boiler plant prior to delivery of said feed water to the circulatory system of the boiler plant, which comprises: diverting some of the hot boiler water from the circulatory system of the boiler plant at a temperature close to but slightly less than the steaming temperature at the prevailing boiler pressure and utilizing the pressure obtaining in the circulatory system to cause the diverted hot boiler water to flow in a defined path which leads outside the heated portions of the boiler plant and then returns to the boiler circulatory system; effecting indirect heat exchange between the diverted hot boiler water and the feed water to be heated in a zone outside the heated portions of the boiler plant whereby the feed water is heated to a temperature less than said steaming temperature and the heating of feed water is accomplished without causing precipitants carried thereby to form into scale, while at the same time the diverted boiler water is cooled; and reheating the cooled boiler water by passing the same in its path back to the boiler circulatory system in indirect heat exchange relation with the flue gases leaving the furnace of the boiler plant.

5. The method set forth in claim 4 which includes the further step of controlling the quantity of hot boiler water diverted from the boiler circulatory system and flowing in indirect heat exchange relation with the feed water to be heated and the flue gases, to maintain the temperature of the feed water entering the boiler circulatory system above a predetermined minimum and to maintain the temperature of the cooled boiler water slightly above the dew point temperature of the flue gases.

6. In a steam boiler plant having a forced fed fluid circulating system including a steam drum and a circulating pump for forcefully circulating boiler fluid from the steam drum through the steam generating tubes of the fluid circulating system and back to the steam drum, and having a flue gas duct through which the combustion gases leave the furnace of the boiler plant; means for heating feed water fed to the fluid circulating system of the boiler plant characterized by the provision of: a feed water heater exterior to the boiler plant; means including a feed water pump for forcing feed water through the heat absorbing section of the feed water heater and into the fluid circulating system of the boiler plant; duct means connecting the outlet of the circulating pump of the boiler plant with the inlet of the heat supplying section of the feed water heater whereby hot boiler water from the fluid circulating system of the boiler plant constitutes the heating medium for the feed water heater; a heat exchanger in the flue gas duct; and duct means connecting said heat exchanger in series circuit between the outlet of the heat supplying section of the feed water heater and the fluid circulating system whereby heat abstracted from the hot boiler water in its passage through the feed water heater is restored by the indirect heat exchange relation between the hot flue gases flowing over said heat exchanger and the cooled boiler water flowing through said heat exchanger.

DAVID DALIN.
GUSTAV VILHELM HAGBY.
TORSTEN GUSTAF ALBERT WYKMAN.

REFERENCES CITED

The following references are of record in the file of this patent:

UNITED STATES PATENTS

| Number | Name | Date |
|---|---|---|
| 497,046 | Benjamin | May 9, 1893 |
| 1,555,435 | Rohrer | Sept. 29, 1925 |
| 1,563,938 | Sullivan | Dec. 1, 1925 |
| 1,592,893 | McGill | July 20, 1926 |
| 1,612,854 | Broido | Jan. 4, 1927 |
| 1,835,610 | Page | Dec. 8, 1931 |
| 1,852,293 | Engler | Apr. 5, 1932 |
| 1,915,460 | Wilson | June 27, 1933 |
| 1,916,426 | Hughs et al. | July 4, 1933 |
| 1,975,519 | Rudorff | Oct. 2, 1934 |
| 2,419,681 | Gartmann | Apr. 29, 1947 |

FOREIGN PATENTS

| Number | Country | Date |
|---|---|---|
| 3,756 | Great Britain | Feb. 19, 1908 |
| 236,115 | Great Britain | July 2, 1925 |
| 581,883 | Germany | Aug. 4, 1933 |